United States Patent
Altenkirch

(10) Patent No.: US 7,194,341 B2
(45) Date of Patent: Mar. 20, 2007

(54) METHOD AND DEVICE FOR DETERMINING THE GEOMETRIC VEHICLE INCLINATION OF A MOTOR VEHICLE

(75) Inventor: Manfred Altenkirch, Wasbuettel (DE)

(73) Assignee: Volkswagen AG, Wolfsburg (DE)

( * ) Notice: Subject to any disclaimer, the term of this patent is extended or adjusted under 35 U.S.C. 154(b) by 144 days.

(21) Appl. No.: 10/494,533

(22) PCT Filed: Oct. 18, 2002

(86) PCT No.: PCT/EP02/11664

§ 371 (c)(1),
(2), (4) Date: Nov. 19, 2004

(87) PCT Pub. No.: WO03/040652

PCT Pub. Date: May 15, 2003

(65) Prior Publication Data

US 2005/0085950 A1    Apr. 21, 2005

(30) Foreign Application Priority Data

Nov. 6, 2001   (DE) ................... 101 54 341

(51) Int. Cl.
*G01C 9/06* (2006.01)
(52) U.S. Cl. .......................... 701/1; 340/440
(58) Field of Classification Search ............. None
See application file for complete search history.

(56) References Cited

U.S. PATENT DOCUMENTS

| 4,725,957 | A | 2/1988 | Alberter et al. |
|---|---|---|---|
| 5,408,411 | A | 4/1995 | Nakamura et al. |
| 5,446,658 | A | 8/1995 | Pastor et al. |
| 6,253,602 | B1 | 7/2001 | Uchida |
| 6,349,255 | B1 | 2/2002 | Heckmann et al. |
| 6,456,194 | B1* | 9/2002 | Carlson et al. ............. 340/440 |
| 6,694,226 | B2* | 2/2004 | Tobaru et al. ................. 701/1 |
| 6,701,224 | B1 | 3/2004 | Klusemann |
| 2002/0045981 | A1* | 4/2002 | Ichikawa et al. ............. 701/91 |
| 2002/0169544 | A1* | 11/2002 | Hashida ...................... 701/207 |

FOREIGN PATENT DOCUMENTS

DE    34 22 490    12/1985

(Continued)

*Primary Examiner*—Michael J. Zanelli
(74) *Attorney, Agent, or Firm*—Kenyon & Kenyon LLP

(57) ABSTRACT

A method is for determining a geometric vehicle inclination $\alpha$ of a motor vehicle, where an acceleration signal of at least one acceleration sensor is used and a speed gradient dv/dt is determined from a measured vehicle speed v, where a) in the case of a moving or standing vehicle, an acceleration value $a_S$ is derived from a force acting on the acceleration sensor, b) a corrected acceleration value $a_{korr}$ is determined as a function of the speed gradient dv/dt, and c) the current vehicle inclination $\alpha$ is directly deduced from the corrected acceleration value $a_{korr}$. In addition, a device for implementing a method to determine a geometric vehicle inclination $\alpha$ of a motor vehicle, the device includes a speed-measuring device and at least one acceleration sensor, a programmable and readable microcontroller being provided, with the aid of which the current vehicle inclination a may be calculated from the values of the speed-measuring device and the acceleration sensor at a vehicle speed v of the vehicle greater than or equal to zero, and directly transmitted to at least one control unit.

11 Claims, 1 Drawing Sheet

FOREIGN PATENT DOCUMENTS

| | | |
|---|---|---|
| DE | 42 01 146 | 7/1992 |
| DE | 43 08 128 | 6/1994 |
| DE | 198 59 112 | 7/1999 |
| DE | 198 10 213 | 9/1999 |
| DE | 199 04 066 | 7/2000 |
| DE | 100 26 102 | 2/2001 |
| JP | 2002-162225 * | 6/2002 |
| WO | WO 99/17964 | 4/1999 |

* cited by examiner

METHOD AND DEVICE FOR DETERMINING THE GEOMETRIC VEHICLE INCLINATION OF A MOTOR VEHICLE

FIELD OF THE INVENTION

The present invention relates to a method for determining a geometric vehicle inclination α of a motor vehicle, where an acceleration signal of at least one acceleration sensor is used and a speed gradient dv/dt is calculated from a measured vehicle speed v.

The present invention also relates to a device for implementing a method to determine a geometric vehicle inclination α of a motor vehicle, the device having a speed-measuring device and at least one acceleration sensor.

BACKGROUND INFORMATION

The handling and the performance of a motor vehicle is, to a considerable extent, a function of its current geometric inclination, i.e., if it is on a flat or an inclined roadway. For example, the control of the control systems mostly available in modern motor vehicles, such as ABS (anti-lock brake system), TCS (traction control system) and ESP (electronic stability program) should be adjusted to the specific vehicle inclination. These systems are equipped with acceleration sensors and speed sensors, and, in certain driving situations, they intervene in the brake management and engine management. Knowledge of the vehicle inclination is important for optimally controlling the braking performance and traction performance. Knowledge of the vehicle inclination may also have an influence on or be transmitted to the transmission control system, in order to improve the gear-shifting operations and protect against unintentional switching operations while driving uphill and downhill. In addition, the inclination of a stationary vehicle is also of interest, e.g., for protecting against rolling back unintentionally and optimizing the driveaway characteristics. Furthermore, knowledge of a transverse inclination, i.e., transverse to the driving direction, is very important for preventing a possible overturning hazard, especially in the case of so-called off-road vehicles, when the roadway conditions are difficult on pathless terrain.

In the case of conventional systems having special inclination sensors, it has turned out to be a problem that they often register incorrect inclination values in the event of simultaneous vehicle accelerations. Other systems only determine the values after a certain driving time or driving distance or are only suitable for determining longitudinal inclinations.

A method for detecting uphill or downhill driving of a motor vehicle is described in German Published Patent Application No. 100 26 102. The object of the method is to bring a reference speed, which is determined from wheel-speed sensor signals and can significantly deviate from the actual vehicle speed in certain situations, e.g., in the case of spinning wheels, toward the actual speed as rapidly as possible, in order to thereby improve the control of electronic systems, which refer to the reference speed. A reference acceleration is determined from the reference speed of the vehicle, using differentiation. This is compared to a sensor-determined, longitudinal vehicle acceleration. If the difference of the longitudinal vehicle acceleration and the reference acceleration exceeds a specified threshold value over a certain minimum period of time, then uphill or downhill driving is detected.

In the conventional method, it turns out to be disadvantageous that it only functions in the case of a moving vehicle, and that a certain distance traveled or driving time is necessary for detecting a vehicle inclination. In addition, it is only suitable for detecting longitudinal inclinations, i.e., inclines or declines, but not for detecting transverse inclinations. It is also disadvantageous that, in the case of all-wheel drive vehicles, the drive or transmission must be temporarily interrupted at one axle, in order to implement the method. In addition, a relatively complicated, digital, logical counting circuit is necessary.

A method for determining the longitudinal roadway inclination, one a motor vehicle is driven without braking it, is described in German Published Patent Application No. 43 08 128. In this connection, a slip difference is determined by comparing the wheel speeds of the wheels on a driven axle and a freely revolving axle. A flat roadway, an incline, or a decline is detected as a function of the combination of the slip-difference sign and the sign of a vehicle speed change determined from the wheel speeds.

In the case of the conventional method, it is disadvantageous that it is only usable while driving without braking. In addition, it is not designed for all-wheel-drive vehicles and is only suitable for determining a longitudinal inclination.

Therefore, an aspect of the present invention is to provide a method for determining a vehicle inclination, which may immediately provide the current geometric vehicle inclination, both during vehicle operation and when the vehicle is stationary, which may be suitable for determining longitudinal and transverse inclinations, and which may not require much effort to implement.

SUMMARY

In an example embodiment of the present invention:
a) in the case of a traveling or standing vehicle, an acceleration value $a_S$ is derived from a force acting on acceleration sensor 1;
b) a corrected acceleration value $a_{korr}$ is calculated as a function of speed gradient dv/dt; and
c) current vehicle inclination α is directly deduced from corrected acceleration value $a_{korr}$.

An available acceleration signal, e.g., a longitudinal acceleration in the ESP, is evaluated together with a speed signal already available as well, e.g., in the case of all vehicles equipped with ABS, such that actual inclination α of the vehicle may be immediately available, i.e., without the vehicle having to travel a certain distance or a certain period of time having to elapse during which various measurements must be made. Even in the case of a standing vehicle, the acceleration sensor outputs an acceleration value corresponding to the force or mass acting on it, the force or mass being able to be produced by, e.g., a change in the axle-load distribution on an incline in comparison with that of a flat roadway. During the drive, a falsification of the ascertained result due to possible speed changes of the vehicle may be prevented by taking speed gradient dv/dt into consideration.

In an example embodiment of the present invention, vehicle inclination α may be calculated according to the equation $$\alpha = \arcsin\left\{\frac{(a_s - dv/dt)}{g}\right\}.$$

An acceleration sensor may not distinguish or determine whether the value indicated by it is caused by a change in vehicle speed v or by a vehicle inclination α. However, it may always indicate the sum $a_s = g \cdot \sin \alpha + dv/dt$. Since vehicle speed v is measured in all modern vehicles, a vehicle speed change dv/dt may also be derived. Therefore, geometric inclination α of the vehicle (in radians) may be directly determined according to the above equation, using gravitational acceleration $g = 9.81$ m/s². During the determination of transverse inclinations, the effects of centrifugal accelerations are additionally considered in the calculation.

According to an example embodiment of the present invention, corrected acceleration value $a_{korr} = a_s - dv/dt$ may be compared to a specified threshold acceleration value $a_{S1}$ of acceleration sensor 1, and a difference may be made between an incline and a decline as a function of a deviation direction.

On the basis of, for example, a calibration, the acceleration sensor is assigned a threshold value, which corresponds to a flat roadway. The upward or downward deviation of corrected acceleration value $a_{korr}$ from threshold value $a_{S1}$ allows a difference to be made between an incline and a decline. Depending on the arrangement and design of the read-out acceleration sensor, a particular deviation direction may correspond to an incline or a decline in the direction of travel.

According to an example embodiment of the present invention, a longitudinal inclination $\alpha_L$ of the vehicle may be determined from the acceleration signal of a longitudinal-acceleration sensor. In addition, a transverse inclination $\alpha_Q$ of the vehicle may be determined from the acceleration signal of a transverse-acceleration sensor.

The method may be suitable for determining both longitudinal inclinations, i.e., inclines or declines, and transverse inclinations, i.e., lateral roadway inclinations transverse to the direction of travel. This information may be transmitted to the electronic control systems of the vehicle, which means that the information may improve the reliability of these systems and increases the safety of the vehicle performance, in particular in limit situations.

Conventional devices for implementing methods to determine an inclination of a motor vehicle have the disadvantage that they are not designed for standing vehicles. In addition, they cannot determine transverse inclinations.

Therefore, a further aspect of the present invention is to provide a device, by which longitudinal and transverse inclinations may be determined for standing and moving vehicles.

In this regard, a programmable and readable microcontroller may be provided, with the aid of which current vehicle inclination α may be calculated from the values of the speed-measuring device and the acceleration sensor at a vehicle speed v of the vehicle greater than or equal to zero, and directly transmitted to at least one control unit.

The microcontroller may be programmed with one or more computational algorithms, which process the speed and acceleration values and output the geometric vehicle inclination as a result. The microcontroller differentiates between longitudinal and transverse inclination, as well as between decline and incline, in accordance with the sensor data. The outputted signals are conditioned so that they may be passed on to a control unit for further processing.

According to an example embodiment of the present invention, the signals output by the microcontroller may be processed further by a transmission control unit. The microcontroller signals may also be processed further by an engine control unit and/or an all-wheel-drive control unit and/or a brake control unit; and/or an adaptive cruise control unit and/or a vehicle-dynamics control unit and/or a drive-train control unit. In general, the control units are operatively connected to each other and to the existing control systems, such as ABS, TCS, and ESP.

The signals of the microcontroller are conditioned so that they may be read by the control units. These data may then be used for optimizing the gearshift-mechanism control, e.g., in automatic transmissions, and for controlling the power output and torque output of the driving engine on inclines and declines. In the case of a standing vehicle, the inclination data may be used, for example, to activate devices for preventing unintentional backwards-rolling. More specific and more effectively dosed braking actions may be undertaken by the ABS with the aid of the inclination data. The TCS functions comparably in limit situations, e.g., with respect to the driveaway characteristics, and the ESP functions comparably in limit situations, with respect to the cornering ability.

An example embodiment of the present invention provides an instrument display, on which vehicle inclination α is displayable.

The display may show the current vehicle inclination converted to an upgrade or downgrade %. This may allow the driver to receive additional, useful information, in order to possibly adapt his driving behavior to the corresponding situation in a more effective manner.

According to an example embodiment of the present invention, a rollover warning device may be activated in response to a specifiable transverse inclination $\alpha_Q$.

The rollover warning may be of an acoustic or optical kind. This may allow the driver to timely react in limit situations, which means that the safety may be increased, e.g., in the case of off-road vehicles.

Further details of the present invention are derived from the following detailed description and appended Figure, in which an example embodiment of the present invention is illustrated.

DETAILED DESCRIPTION

Figure 1:
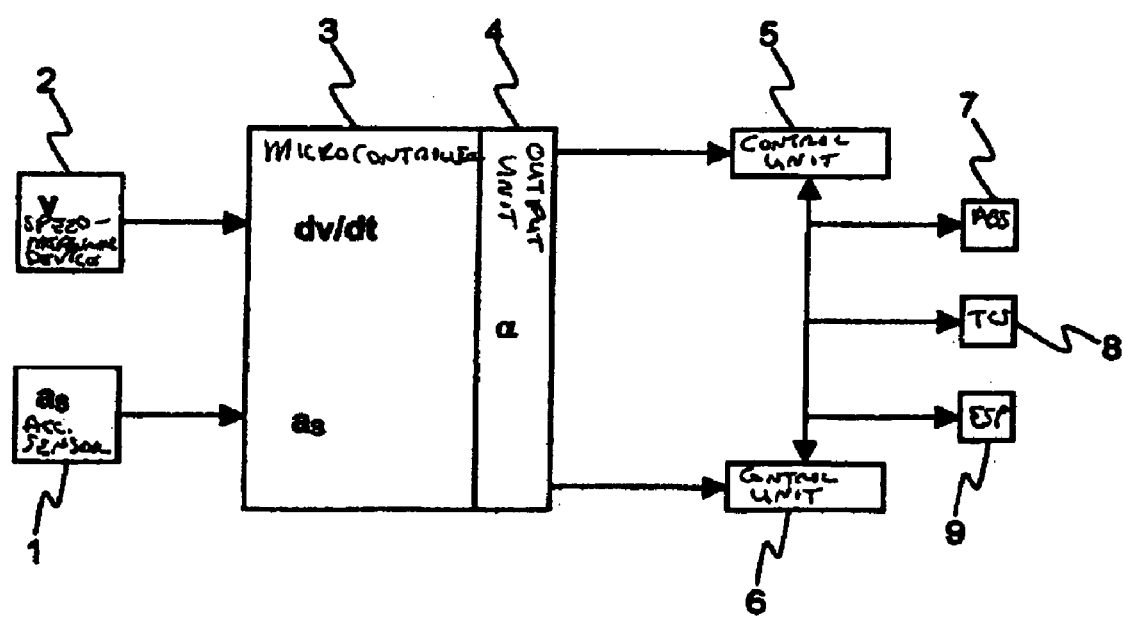
FIG. 1 is a block diagram to illustrate the method for ascertaining a geometric vehicle inclination of a motor vehicle.

A device for implementing a method to determine a geometric vehicle inclination α of a motor vehicle is essentially made up of a speed-measuring device 2, an acceleration sensor 1, and a microcontroller 3.

Speed-measuring device 2 may include a speed sensor on each wheel. The vehicle may include an ESP longitudinal-acceleration sensor, which forms acceleration sensor 1. Speed-measuring device 2 and acceleration sensor 1 are connected via signal lines to microcontroller 3, which has, on its part, an output unit 4. Further signal lines lead from this output unit 4 to a transmission control unit 5 and an engine control unit 6. Control units 5, 6 are bidirectionally connected among each other so as to be able to transmit signals to each other, and they are connected to three control systems 7, 8, 9. The control systems take the form of an ABS control system 7, a TCS control system 8, and an ESP control system 9.

A method for determining a geometric vehicle inclination α of a motor vehicle is essentially based on the evaluation of an acceleration signal $a_S$, while taking a speed gradient dv/dt into consideration.

Speed-measuring device 2 evaluates the individual, measured wheel speeds and determines a vehicle speed v from them, which is transmitted to microcontroller 3. Microcontroller 3 calculates a speed gradient dv/dt, using differentiation. Acceleration sensor 1 transmits an acceleration value $a_S$ to microcontroller 3. A computational algorithm according to the equation $a_{korr}=a_s-dv/dt$ is programmed in microcontroller 3.

The subtracting of speed gradient dv/dt from acceleration value $a_s$ yields a corrected value $a_{korr}$ independent of vehicle speed v. When the vehicle is standing, dv/dt=0 directly results in $a_S=a_{korr}$. Longitudinal vehicle inclination $\alpha_L$ determined according to the longitudinal-acceleration sensor is transmitted as a result of the algorithm, to output unit 4, which transmits, for its part, the correspondingly conditioned signal to transmission control unit 5 and engine control unit 6, by which the signal is supplied, in each instance, to control systems 7, 8, 9. A transverse inclination $\alpha_Q$ may be determined in an analogous manner, using a transverse-acceleration sensor. In this context, the computational algorithm is modified in view of the centrifugal forces. In addition, microcontroller 3 may transmit data, such as vehicle speed v, directly from speed-measuring device 2 to the control systems. Control units 5, 6 and control systems 7, 8, 9 take specific vehicle inclination $\alpha_L$ or $\alpha_Q$ into consideration in their response, for instance in gear changes, engine-torque reductions, or braking actions.

LIST OF REFERENCE NUMBERALS 1 acceleration sensor
2 speed-measuring device
3 microcontroller
4 output unit
5 transmission control unit
6 engine control unit
7 ABS control system
8 TCS control system
9 ESP control system

What is claimed is:

1. A method for determining a geometric vehicle inclination of a motor vehicle, comprising:
    calculating a speed gradient from a measured vehicle speed;
    deriving an acceleration value from a force acting on an acceleration sensor for one of (a) a traveling vehicle and (b) a standing vehicle, the acceleration sensor configured to generate an acceleration signal;
    calculating a corrected acceleration value as a function of the speed gradient;
    directly calculating a current vehicle inclination from the corrected acceleration value;
    comparing the corrected acceleration value to a predetermined threshold acceleration value of the acceleration sensor; and
    determining one of (a) an incline and (b) a decline as a function of a deviation direction.

2. The method according to claim 1, wherein the vehicle inclination is calculated in the vehicle inclination calculating step according to the equation:

$$\alpha = \arcsin\left\{\frac{(a_s - dv/dt)}{g}\right\};$$

wherein a represents the vehicle inclination, $a_s$ represents the acceleration value, and dv/dt represents the speed gradient.

3. The method according to claim 1, wherein the corrected acceleration value satisfies the relationship $a_{korr}=a_s-dv/dt$;
    wherein $a_{korr}$ represents the corrected acceleration value, $a_s$ represents the acceleration value, and dv/dt represents the speed gradient.

4. The method according to claim 1, further comprising determining a longitudinal inclination of the vehicle from an acceleration signal of a longitudinal-acceleration sensor.

5. The method according to claim 1, further comprising determining a transverse acceleration of the vehicle from an acceleration signal of a transverse-acceleration sensor and a centrifugal acceleration.

6. A device for determining a geometric vehicle inclination of a motor vehicle, comprising:
    a speed-measurement device;
    at least one acceleration sensor; and
    a programmable and readable microcontroller configured to calculate a current vehicle inclination based on a corrected acceleration value determined from values of the speed-measurement device and the acceleration sensor at a vehicle speed of the vehicle greater than or equal to zero and configured to directly transmit the vehicle inclination to at least one control unit;
    wherein the microcontroller is configured to compare the corrected acceleration value to a predetermined threshold acceleration value of the acceleration sensor and determine one of (a) an incline and (b) a decline as a function of a deviation direction.

7. The device according to claim 6, wherein the at least one control unit includes a transmission control unit configured to process signals output by the microcontroller.

8. The device according to claim 6, wherein the at least one control unit includes at least one of an engine control unit, an all-wheel-drive control unit, a brake control unit, an adaptive cruise-control unit, a vehicle-dynamics control unit and a drive-train control unit, the at least one of the engine control unit, the all-wheel-drive control unit, the brake control unit, the adaptive cruise-control unit, the vehicle-dynamics control unit and the drive-train control unit configured to process signals output by the microcontroller.

9. The device according to claim 6, further comprising an instrument display configured to display the vehicle inclination.

10. The device according to claim 6, further comprising an arrangement configured to activate a rollover warning device in response to a specifiable transverse inclination in accordance with the vehicle inclination determined by the microcontroller.

11. A device for determining a geometric vehicle inclination of a motor vehicle, comprising:
    means for calculating a speed gradient from a measured vehicle speed;
    means for deriving an acceleration value from a force acting on an acceleration sensor for one of (a) a traveling vehicle and (b) a standing vehicle, the acceleration sensor configured to generate an acceleration signal;
    means for calculating a corrected acceleration value as a function of the speed gradient;
    means for directly calculating a current vehicle inclination from the corrected acceleration value;
    means for comparing the corrected acceleration value to a predetermined threshold acceleration value of the acceleration sensor; and
    means for determining one of (a) an incline and (b) a decline as a function of a deviation direction.

* * * * *